United States Patent Office 2,712,696
Patented July 12, 1955

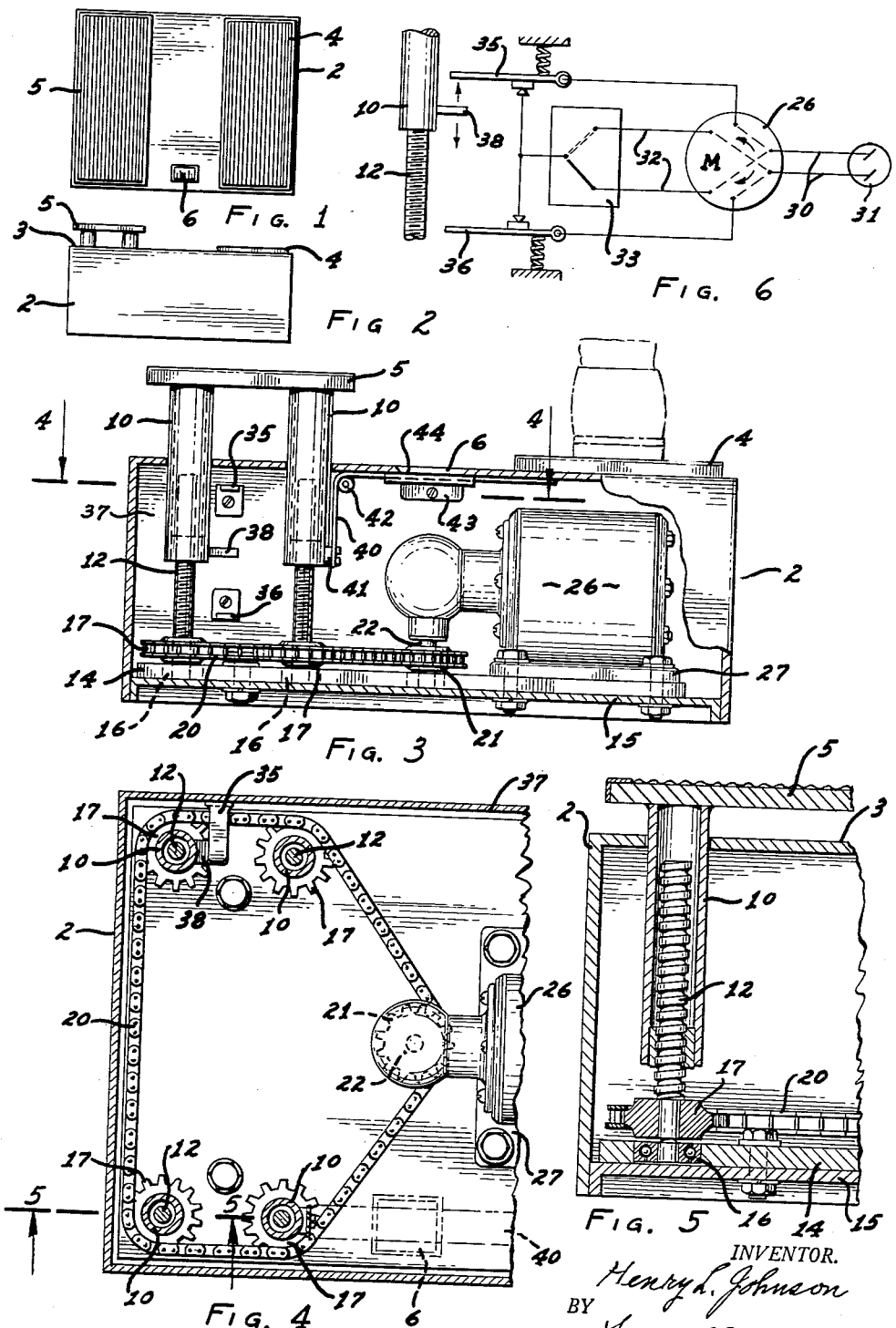

2,712,696
PELVIC LEVELING AND LEG MEASURING MACHINE

Henry L. Johnson, Phoenix, Ariz.

Application March 5, 1954, Serial No. 414,468

3 Claims. (Cl. 33—170)

This invention concerns a device for measuring the difference in leg length of persons who have legs of different lengths so that corrective appliances may be accurately fitted.

Heretofore, differences in leg length have been measured by blocking up the shorter leg and maintaining the pelvis level as indicated by spirit level attached to a pelvic applicator. The blocking process continued until the weight of the patient was applied to both legs equally while the pelvis was indicated as level. The height of the blocks necessary to produce this condition was then measured. This method is time consuming and includes tedious repetitive trial and error operations.

One of the objects of this invention is to produce a machine which will quickly, accurately, and immediately adjust the height of a foot platform corresponding to a stationary foot platform so that the weight of the patient, being applied to both platforms, and the pelvis bones maintained level, and indicator will show the amount of correction necessary to bring the shorter leg into correct position.

Another object of the machine and device as herein concerned is to provide a containing case having a top with a stationary foot platform on one side and an elevatable foot platform on the other side, combined with mechanism within the case which will raise and lower the movable platform by mechanical power as desired and will indicate the distance which the movable platform has been raised or lowered relative to the stationary foot platform.

A further object of the invention is to provide a mechanism for measuring the different leg lengths of persons which has two platforms for the feet of the person measured, one of which is raised and lowered by mechanical mechanism; said mechanism being controllable at a distance from the platforms and mechanism so that the operator of the machine may observe the posture of a person standing on said platforms and the effect on pelvic levelling of the operation of the machine.

Similar numerals refer to similar parts in the several views.

I attain the foregoing objects by means of the mechanism shown in the accompanying drawings in which—

Figure 1 is a plan view of a device incorporating the invention herein;

Figure 2 is a side elevation thereof;

Figure 3 is a side elevation thereof drawn on an enlarged scale and with portions of the outer casing broken away to show interior construction;

Figure 4 is a sectional plan view thereof, taken substantially on line 4—4 of Figure 3, and drawn on a similar enlarged scale;

Figure 5 is a mid-sectional elevation of one of the lifting elements of the movable platform; and Figure 6 is an electrical diagram showing the electrical circuits operating the mechanism within said case.

Similar numerals refer to similar parts in the several views.

Rectangular faced case 2 is intended to rest on the floor. Its top face 3 supports a stationary foot platform 4, on one side portion, and a vertical movable foot platform 5 over the opposite side portion. Between these foot platforms there is a window 6 through which an elevation indicating scaled tape 7 is viewed. This tape indicates the distance the movable foot platform is raised above the level of the stationary platform.

Movable platform 5 is supported on four vertical cylindrical legs 10 which are attached to each of the corner portions of its under face and depend therefrom. Each of these legs is bored and provided with a threaded portion at its lower end which receives a jack screw 12. The lower end of each screw 12 is tightly fitted into and bears in a ball thrust bearing 16, which is, in turn, fitted into an assembly plate 14, which is attached to case bottom plate 15. Each screw is provided with a sprocket 17 which is keyed to and shrunk onto its said bottom end.

All of the jack screws 12 are rotated simultaneously by a chain 20 which runs over each of their respective sprockets and a driving sprocket 21 which is keyed onto a vertical shaft 22 and is part of speed reduction gearing supported on the frame of motor 26. Sprocket 21 is located centrally of case 2 and to the right of the four jack screws 12, as viewed in Figure 3.

Motor 26 is mounted on a suitable base 27 which is secured to plate 14, and may be of any suitable type such as a universal series wound motor with reversible field connections or a reversible high torque induction motor. In either case a flexible conduit cord 30 connects to a wall outlet socket 31, and leads 32 for controlling the motor connect to a switch 33 in a portable switch box which has contacts for starting, stopping, and reversing the motor.

To prevent overrunning of screws 12 in legs 10, limit cut off switches 35 and 36 are provided and positioned on the case side 37 and are opened by tripping lug 38 which is attached to one of the legs. These switches are included in the electrical operating circuit of motor 26 and operate independently of switch 33.

To indicate the vertical position of movable platform 5 there is a flexible steel tape 40 which has its inner end attached to bracket 41 on one of said legs 10 and extends upward to roller 42 and thence horizontally over the roller and into guides 43 so that its outer portion 44 slides under window 6.

In use, the case 2 is placed on the floor and the patient stands on it with his shorter leg on the movable foot platform 5.

The operator, after placing the pelvic levelling device on the patient, stands at a short distance from the case and operates motor 26 by means of switch 33. The movable foot platform is raised until it is noted that the pelvis of the patient is level. At this time, the reading on tape 7 is noted. This reading will indicate the exact height of appliances necessary to be used on the patient.

In observing the levelling of the pelvis, the operator not only notes when the pelvis is level but also when the correct posture of the patient is attained. Since this is done by observation, it is necessary that the switch 33 be on a sufficient length of cord so that the operator may observe the patient from a distance of several feet as well as from a distance close enough to the case to read tape 7. Since the raising operation of the platform 5 is done by mechanical means, levelling is rapid and efficient. Also, in case the first levelling operation is too much, a lowering of the platform is also rapidly attained by use of the reversing portion of motor 26.

When the measurements are completed, the platform 5 may be returned to a level with a stationary platform by reversing the motor. Overrunning in either direction is prevented by the cut out switches 35 and 36 so that there is no danger of jamming the screws in the legs 10.

In view of the foregoing, it will be noted that I have provided an efficient device for ascertaining the amount of blocking up necessary to provide an efficient appliance for a person who has one leg shorter than the other.

Since mechanical equivalents may be substituted for the several elements of the device as shown, I make the following claims:

1. A device for pelvic leveling and measuring differences in leg lengths consisting of a case having a top, bottom plate, and sides, a stationary foot platform on one side of the top of said case, a vertically movable foot platform operating over the opposite side of the top of said case; mechanism for raising and lowering said vertically movable foot platform including a plurality of screw jacks having threaded legs attached to the bottom of said movable platform, and jack screws supported and journalled on shafts extending upward from said case bottom plate; motor driven mechanism for rotating said jack screws simultaneously including a reversible electric motor within said case having a starting, stopping, and reversing switch attached to said motor by a flexible cord extending from said case; and a graduated tape observable through the top of said case for indicating the height of said movable foot platform relative to said stationary foot platform 2. A pelvic leveling and leg measuring machine consisting of a case, having a body with a rectangular top, having a tape viewing window, a stationary foot platform attached to one longitudinal end portion of said top, a vertically movable foot platform operating over the opposite end portion of said top; mechanical raising and lowering mechanism for said movable foot platform disposed within said case; a reversible electric motor controlled by a switch on a cord extending from said case; and a tape for indicating the difference between the height of said stationary and movable platforms having one end attached to said raising and lowering mechanism within said case and movable thereby, supported beneath and visible through said viewing window in said case top.

3. A device for pelvic leveling and measuring differences in leg lengths consisting of a case having a top, including a viewing window, bottom plate, and sides, a rectangular stationary foot platform on one side of the top of said case, a vertically movable rectangular foot platform positioned parallel to said stationary foot platform, operating over the opposite side of the top of said case; mechanism for raising and lowering said vertically movable foot platform composed of internally threaded tubular legs depending from corner portions of said movable foot platform, jack screws having their upper ends threaded into said legs and their lower ends journalled in bearings on the bottom plate of said case; mechanism for turning said jack screws in unison including sprockets keyed to the bottom portions of said screws, a reversible electric motor, having a driving sprocket, attached to the bottom plate of said case and a chain running around said sprockets on said screws and said motor driving sprocket; a flexible multiple conductor cord extending from said case having a switch controlling the operation of said motor; a tape for indicating the height of said movable platform relative to said stationary platform, having indicia, slidably operating in said case beneath said top viewing window, having one end attached to one of the legs of said movable platform and attaining longitudinal movement therefrom.

References Cited in the file of this patent

UNITED STATES PATENTS

| | | |
|---|---|---|
| 1,225,811 | Hasty | May 15, 1917 |
| 1,496,946 | Reich | June 10, 1924 |
| 2,160,027 | Matthias | May 30, 1939 |

FOREIGN PATENTS

| | | |
|---|---|---|
| 658,136 | Germany | Mar. 23, 1938 |